UNITED STATES PATENT OFFICE.

BENJAMIN E. R. NEWLANDS, OF TEMPLE HOUSE, EAST HAM, COUNTY OF ESSEX, ENGLAND.

MANUFACTURE OF SULPHATE OF ALUMINA.

SPECIFICATION forming part of Letters Patent No. 243,949, dated July 5, 1881.

Application filed February 10, 1881. (No specimens.) Patented in England December 17, 1880.

*To all whom it may concern:*

Be it known that I, BENJAMIN EDWARD REINA NEWLANDS, a subject of the Queen of Great Britain, and residing at Temple House, East Ham, county of Essex, England, have invented certain Improvements in the Manufacture of Sulphate of Alumina, (for which I have obtained a patent in Great Britain, No. 5,287, dated December 17, 1880,) of which the following is a specification.

My invention relates to the purification of sulphate of alumina by forming of the impure salt a magma containing sufficient water to hold the impurities in solution and leave the sulphate of alumina in a practically pure state, and then removing by pressure or centrifugal action the mother-liquor containing the impurities in solution.

In carrying out my invention, I evaporate a solution of sulphate of alumina, containing more or less impurities, to such a degree (say 35° Baumé, or thereabout, at the boiling-point) that it will partially solidify on cooling, forming a magma or mass of crystals, or I add a small quantity of water to solid sulphate of alumina and incorporate the two together so as to produce a magma. This magma I place in bags, and subject the same to pressure in a hydraulic or other press, or I submit it to pressure in a filter-press worked by hydraulic or other power, or I place it in an apparatus in which it is exposed to atmospheric pressure with or without exhaustion, and so obtain cakes of sulphate of alumina containing almost no free acid and only a very small amount of iron. Instead of using a press, the magma may be dried in a centrifugal machine lined, by preference, with flannel, and thus a nearly pure salt may be obtained. After having separated a considerable portion of the sulphate of alumina by the means hereinbefore described the residual mother-liquor is concentrated by heat until it is sufficiently strong to give a magma of crystals on cooling, and this second magma is submitted to pressure, as before, and yields a tolerably pure sulphate of alumina. The same operation may be repeated, and the impure mother-liquor finally left yields a sulphate of alumina containing a considerable amount of iron, which may be used for the purification of sewage or for any other purpose for which sulphate of alumina is required, and in which the presence of iron is not objectionable.

In carrying my invention into effect, instead of using ordinary sulphate of alumina, I sometimes employ a mixture of this compound with silica, such as the well-known alum-cake.

Before evaporating the solution of sulphate of alumina or mixing the impure sulphate of alumina with water, or at the time of so doing, I sometimes add to it a small quantity of hydrochloric acid or of a soluble chloride, such as chloride of aluminium, capable of forming chloride of iron by double decomposition with the sulphate of iron present. This addition renders the iron more easily removable.

I claim as my invention—

The method of purifying sulphate of alumina from sulphuric acid and iron by evaporating a solution of the impure salt to the proper degree, or by adding water to said salt in sufficient quantity to obtain the impurities in solution and leave the sulphate of alumina practically pure, and then separating the mother-liquor containing the impurities by pressure or centrifugal action, substantially as described.

In testimony whereof I have signed my name to this specification in the presence of two subscribing witnesses.

B. E. R. NEWLANDS.

Witnesses:
 H. S. CARR,
 *82 Graham Road, Dalston, Clerk.*
 G. I. MARSHALL,
 *2 Portland Villas, Barking Road, Essex, Clerk.*